United States Patent [19]

Christe

[11] 4,038,374
[45] July 26, 1977

[54] STABLE CHLORINE TRIFLUORIDE DIOXIDE

[75] Inventor: Karl O. Christe, Calabasas, Calif.

[73] Assignee: Rockwell International Corporation, El Segundo, Calif.

[21] Appl. No.: 714,458

[22] Filed: Aug. 16, 1976

Related U.S. Application Data

[60] Continuation-in-part of Ser. No. 529,773, Dec. 5, 1974, abandoned, which is a division of Ser. No. 290,031, Sept. 18, 1972, Pat. No. 3,873,676.

[51] Int. Cl.$^2$ ................................................. C01B 7/24
[52] U.S. Cl. .................................. 423/466; 423/462; 149/1
[58] Field of Search ............................... 423/462, 466

[56] References Cited

U.S. PATENT DOCUMENTS

| 3,285,842 | 11/1966 | Grosse et al. | 423/466 UX |
| 3,320,031 | 5/1967 | Grosse et al. | 423/466 |
| 3,873,676 | 3/1975 | Christe | 423/466 |

OTHER PUBLICATIONS

Inorg. Nucl. Chem. Letters, vol. 8 (May 1972), No. 5, pp. 453, 454, 455, Pergamon Press, Printed in Gt. Britain.

*Primary Examiner*—Edward Stern
*Attorney, Agent, or Firm*—L. Lee Humphries; Robert M. Sperry

[57] ABSTRACT

Chlorine trifluoride dioxide is disclosed for use as an oxidizer in formulating energetic compositions, such as propellants. The stable $ClF_3O_2$ is produced by reacting a $ClO_2F_2^+$ salt with a strong Lewis base at $-78°$ C.

1 Claim, No Drawings

STABLE CHLORINE TRIFLUORIDE DIOXIDE

The invention herein described was made in the course of or under a contract with the Department of Navy.

CROSS-REFERENCE TO RELATED APPLICATIONS

The application is a continuation-in-part of Ser. No. 529,773 filed, Dec. 5, 1974, now abandoned, and which was a division of Ser. No. 290,031, filed Sept. 18, 1972, and issued Mar. 25, 1975, as U.S. Pat. No. 3,873,676.

BACKGROUND OF THE INVENTION

1. Field of the Invention

This invention relates to compositions of matter and is particularly directed to chlorine trifluoride dioxide and a method of producing the same.

2. Prior Art

Energetic compositions of matter are useful in providing energy sources for rocket engines, guided missiles, auxiliary power units for aircraft, ordnance, demolition and the like. Such compositions conventionally are produced by mixing a fuel with an oxidizer. Obviously, the energy of such compositions results primarily from the oxidation of the fuel. Hence, it is desirable to provide a highly energetic oxidizing agnet. On the other hand, it is equally desirable that the oxidizing agent be a stable material, so as to prevent accidental or unintentional ignition or explosive decomposition of the composition. Numerous organic and inorganic compounds have been proposed heretofore for use as such oxidizing agents. However, it has been found that, as a general rule, stable compounds are low energy oxidizers and high energy oxidizers are unstable. Thus, although some useful oxidizing agents have been disclosed by the prior art, the search for a stable, high-energy, oxidizing material has continued. In recent years, studies have indicated that halogen oxyfluoride materials might provide a satisfactory oxidizing material. However, although empirical formulas may be stated for such materials and some of the properties of such materials may be predicted, the synthesis of these materials has proven to be extremely difficult and it is sometimes found that several materials, each having distinct structures and properties, are defined by a single empirical formula. Thus, U.S. Pat. No. 3,285,842 discloses a process for producing a material which was believed to have the empirical formula chlorine trifluride dioxide, $ClF_3O_2$, which the patent states to be a violet liquid which is unstable at temperatures above $-71°$ C. It was subsequently shown, however, that this composition does not contain the chemical compound $ClF_3O_2$, but consists of a mixture of chlorine fluorides and oxygen fluorides (K. O. Christe, R. D. Wilson, and I. B. Goldberg, J. Fluor-Chem., 7,543 (1976). This fact readily explains the great difference in physical and chemical properties between the composition and the novel composition disclosed in this invention. While it would be expected that the previously claimed composition would also be a highly energetic oxidizing agent, the lack of stability renders it unsafe for use in the production of propellants and the like.

Brief Summary and Objects of Invention

These disadvantages of the prior art are overcome with the present invention and a composition of matter is disclosed which based on its chemical structure truly is chlorine trifluride dioxide. It is sufficiently stable at $+25°$ C and, hence, can be safely employed for manufacturing propellants and the like. In addition, a method is disclosed for producing chlorine trifluoride dioxide by reacting $ClF_2O_2^+ PtF_6^-$ with a strong lewis base at a temprature of about $-78°$ C and separating the products of the reaction by distillation.

Accordingly, it is an object of the present invention to provide a new composition of matter having the chemical composition $ClF_3O_2$.

An additional object of the present invention is to provide a method of producing chlorine trifluoride dioxide.

A specific object of the present invention is to provide chlorine trifluoride dioxide by reacting $ClF_2O_2^+$ salts with nitryl fluoride at a temperature of about $-78°$ C and separating the products of the reaction by distillation.

These and other objects and features of the present invention will be apparent from the following detailed description.

DETAILED DESCRIPTION OF THE PREFERRED EMBODIMENT

In that form of the present invention chosen for purposes of illustration, chlorine trifluoride dioxide has been produced by reacting a $ClF_2O_2^+$ salt, such as $ClF_2O_2^+PtF_6^-$, with a strong Lewis base at $-78°$ C.

EXAMPLE 1

A sample of $ClO_2^+PtF_6^-$ containing about 10% of $ClF_2O_2^+PtF_6^-$ was treated at $-78°$ C in a sapphire reactor with a large excess of FNO for several days. No material noncondensible at $-196°$ C (i.e., $F_2$) was observed. The products, volatile at 25° C were removed and separated by fractional condensation through a series of traps kept at $-126°$ C, $-142°$ C, and $-196°$ C. The $-142°$ C fraction contained a novel compound which was identified by its infrared spectrum as $ClF_3O_2$. The observed frequencies are listed in Table 1 and are in excellent agreement with those expected for a trigonal bypyramidal structure of symmetry $C_{2v}$.

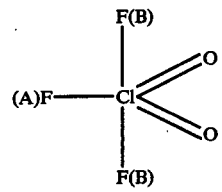

This structure was confirmed by $^{19}F$ nuclear resonance spectroscopy. The observed signal consisted of a typical $AB_2$ pattern centered at $-413$ ppm relative to the external standard $CFCl_3$. The F-F coupling constant was measured to be 443 Hz. The $B_2$ part of the $AB_2$ pattern occurs downfield from the A part, proving that the $B_2$ fluorine atoms occupy the two axial positions. Additional structural proof was obtained from the Raman spectrum of the gas and the liquid showing strong absorptions at 1096, 684, 548, 527, 493, 290, and 229 cm$^{-1}$. The molecular weight of the compound was confirmed by vapor density measurements (measured, 122; calculated, 124). These data establish beyond doubt (see K.O. Christe and R.D. Wilson, Inorg, Chem, 12, 1356 (1973) and K.O. Christe and E.C. Curtis, Inorg, Chem. 12, 2245 (1973) that contrary to the previous claim (U.S.P. 3,285,842) our novel composition has indeed the chemical composition $ClF_3O_2$.

Table I

| Infrared Spectrum of $ClF_3O_2$ and its Tentative Assignment | | |
|---|---|---|
| Frequency $(cm^{-1})$ | Intensity | Assignment for Point Group $C_{2v}$ |
| 1334 | s | $\nu_{10}(B_2)$, $\nu asClO_2$ |
| 1096 | s | $\nu_1(A_1)$, $\nu symClO_2$ |
| 699 | vs | $\nu_7(B_1)$, $\nu asClF_2Ax$ |
| 687 | vs | $\nu_2(A_1)$, $\nu ClF$ |
| 598 | ms | $\nu_{11}(B_2)$, $\delta rock\ ClO_2$ |
| 543) 532) | mw | $\nu_3(A_1)$ and $\nu_8(B_1)$ |

The solid residue obtained from the FNO displacement reaction showed the correct weight change expected for conversion into $NO^+PtF_6^-$. Its identity as $NO^+PtF_6^-$ was confirmed by infrared spectroscopy.

The chlorine trifluoride dioxide is white as a solid having a melting point of about $-81.2°$ C and colorless as a liquid having a boiling point of about $-21°$ C. It is marginally stable at 25° C. The observed stability and lack of color furthermore demonstrate that our product cannot be identical with the previously reported deeply violet and unstable $ClF.O_2F_2$ and $ClF_3 . O_2$ addition compounds supposedly having the empirical composition $ClF_3O_2$.

EXAMPLE II

A sample $ClO_2^+PtF_6^-$ containing about 10% of $ClO_2F_2^+PtF_6^-$ was treated with a sufficient quantity of $FNO_2$ to maintain a liquid phase at $-78°$ C in a stainless steel reactor up to 12 hours. This reaction yielded solid $NO_2^+PtF_3^-$ and gaseous $ClF_3O_2$ plus $FClO_2$. If desired, the chlorine trifluoride dioxide may then be separated by conventional distillation techniques, as in a multiplate distillation tower.

Small amounts of material were purified by combining the $ClF_3O_2$ and $FClO_2$ at $-196°$ C with a small excess of $BF_3$. These materials were allowed to mix and warm to ambient temperature. This results in $ClF_2O_2^+BF_4^-$, which is stable, plus $ClO_2^+BF_4^-$, which has a dissociation pressure of 180 millimeters at 22° C and which can be removed by pumping. The $ClF_2O_2^+BF_4^-$ is then reacted with sufficient $FNO_2$ to maintain a liquid phase at $-78°$ C for up to 12 hours. This reaction produced solid $NO_2^+BF_4^-$ plus gaseous $ClF_3O_2$ and $FNO_2$. The two gases may be pumped off and separated by passing the gases through a pair of traps maintained at $-126°$ C and $-196°$ C, respectively. The chlorine trifluoride dioxide will be caught in the $-126°$ C trap.

Obviously, numerous variations and modifications may be made without departing from the present invention. Accordingly, it should be clearly understood that the forms of the present invention described above are illustrative only and are not intended to limit the scope of the present invention.

What is claimed is:

1. A new composition of matter comprising of chlorine trifuloride dioxide, $ClF_3O_2$, having structure

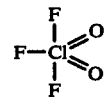

having the infrared spectrum set forth in the following Table,

Table I

| Infrared Spectrum of $ClF_3O_2$ and its Tentative Assignment | | |
|---|---|---|
| Frequency $(cm^{-1})$ | Intensity | Assignment for Point Group $C_{2v}$ |
| 1334 | s | $\nu_{10}(B_2)$, $\nu asClO_2$ |
| 1096 | s | $\nu_1(A_1)$, $\nu symClO_2$ |
| 699 | vs | $\nu_7(B_1)$, $\nu asClF_2Ax$ |
| 687 | vs | $\nu_2(A_1)$, $\nu ClF$ |
| 598 | ms | $\nu_{11}(B_2)$, $\delta rock\ ClO_2$ |
| 543) 532) | mw | $\nu_3(A_1)$ and $\nu_8(B_1)$ | and being a white solid which melts at about $-81°$ C to a colorless liquid and boils at about $-21$ C and is stable up to about $+25°$ C.

* * * * *

UNITED STATES PATENT AND TRADEMARK OFFICE
CERTIFICATE OF CORRECTION

PATENT NO. : 4,038,374
DATED : July 26, 1977
INVENTOR(S) : Karl O. Christe

It is certified that error appears in the above-identified patent and that said Letters Patent are hereby corrected as shown below:

Column 1, line 28, delete "agnet" and insert --agent--.
Column 1, line 52, delete "-71°C" and insert -- -72°C--.
Column 2, line 6, delete "ClF$_2$O$_2$+PtF$_6$-" and insert --ClF$_2$O$_2$$^+$PtF$_6$$^-$ --;

line 6, delete "lewis" and insert --Lewis--.

line 28, delete "ClF$_2$O$_2$+" and insert --ClF$_2$O$_2$$^+$--.

line 29, delete "ClF$_2$O$_2$+PtF$_6$-" and insert --ClF$_2$O$_2$$^+$PtF$_6$$^-$--.

line 33, delete "ClO$_2$+PtF$_6$-" and insert --ClO$_2$$^+$PtF$_6$$^-$--.

line 34, delete "ClF$_2$O$_2$+PtF$_6$-" and insert --ClF$_2$O$_2$$^+$PtF$_6$$^-$--.

line 41, delete "ClF" and insert --ClF--.
lines 46 to 54, the right-hand side of the formula should appear as:

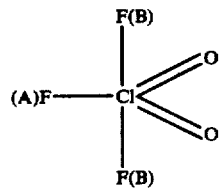    double bond lines
should read     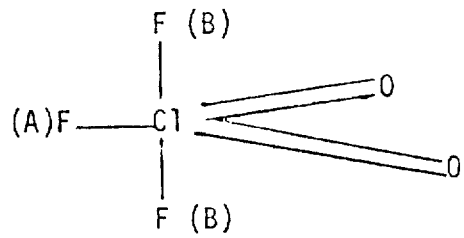

line 54, after "nuclear" insert --magnetic--.
Column 3, line 3, delete "ClF$_3$O$_2$" and insert --ClF$_3$O$_2$--.

lines 17 and 18, delete "NO+PtF$_6$-" and insert --NO$^+$PtF$_6$$^-$--.

line 25, delete "ClF·O$_2$F$_2$" and insert --ClF·O$_2$F$_2$--;

line 25, delete "ClF$_3$· O$_2$" and insert --ClF$_3$· O$_2$--.

line 27, delete "ClF$_3$O$_2$" and insert --ClF$_3$O$_2$--.

UNITED STATES PATENT AND TRADEMARK OFFICE
CERTIFICATE OF CORRECTION

PATENT NO. : 4,038,374 (continued)
DATED : July 26, 1977
INVENTOR(S) : Karl O. Christe It is certified that error appears in the above-identified patent and that said Letters Patent are hereby corrected as shown below:

Column 3, line 29, delete "$ClO_2+PtF_6-$" and insert --$ClO_2^+PtF_6^-$--;
         line 29, after "of" delete "Cl" and insert --Cl--.
         line 30, delete "$O_2F_2+PtF_6-$" and insert --$O_2F_2^+PtF_6^-$--.
         line 33, delete "$NO_2+PtF_3-$" and insert --$NO_2^+PtF_6^-$--;
         line 33, delete "$ClF_3O_2$" and insert --$ClF_3O_2$--.
         line 33, delete "$FClO_2$" and insert --$FClO_2$--.
         line 38, delete "$ClF_3O_2$" and insert --$ClF_3O_2$--;
         line 38, delete "$FClO_2$" and insert --$FClO_2$--.
         line 40, delete "ClF-" and insert --ClF- --.
         line 41, delete "$_2O_2+BF_4-$" and insert --$_2O_2^+BF_4^-$--;
         line 41, delete "$ClO_2+BF_4-$" and insert --$ClO_2^+BF_4^-$--.
Column 4, line 1, delete "180" and insert --182--.
         line 2, delete "$ClF_2O_2+BF_4-$" and insert --$ClF_2O_2^+BF_4^-$--.
         line 5, delete "$NO_2+BF_4-$" and insert --$NO_2^+BF_4^-$--;
         line 5, delete "$ClF_3O_2$" and insert --$ClF_3O_2$--.
         line 17, delete "comprising" and insert --consisting--.
         line 18, delete "$ClF_3O_2$" and insert --$ClF_3O_2$--.

UNITED STATES PATENT AND TRADEMARK OFFICE
CERTIFICATE OF CORRECTION

PATENT NO. : 4,038,374 (continued)

DATED : July 26, 1977

INVENTOR(S) : Karl O. Christe

It is certified that error appears in the above-identified patent and that said Letters Patent are hereby corrected as shown below:

Column 4, lines 21 to 25,  should read 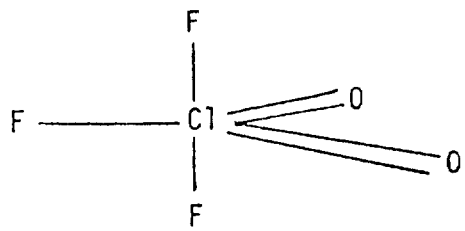

line 38, delete "-21 C" and insert -- -21°C--.

Signed and Sealed this

Twenty-second Day of November 1977

[SEAL]

Attest:

RUTH C. MASON
*Attesting Officer*

LUTRELLE F. PARKER
*Acting Commissioner of Patents and Trademarks*